(12) United States Patent
Chang et al.

(10) Patent No.: US 8,070,479 B2
(45) Date of Patent: Dec. 6, 2011

(54) INJECTION MOLD DEVICE

(75) Inventors: Yuing Chang, Taipei (TW);
 Chung-Shin Liu, Taipei (TW); Li-Wei Chen, Taipei (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 51 days.

(21) Appl. No.: 12/453,085

(22) Filed: Apr. 29, 2009

(65) Prior Publication Data

US 2010/0178376 A1   Jul. 15, 2010

(30) Foreign Application Priority Data

Jan. 15, 2009   (CN) .......................... 2009 1 0036778

(51) Int. Cl.
 *B29C 45/27* (2006.01)
(52) U.S. Cl. ......... 425/569; 425/441; 425/556; 425/572
(58) Field of Classification Search .................. 425/441, 425/443, 556, 569, 572
 See application file for complete search history.

(56) References Cited

U.S. PATENT DOCUMENTS

| 3,724,802 | A |   | 4/1973 | Veneria |
| 3,897,929 | A | * | 8/1975 | Hartmann ...................... 249/105 |
| 4,285,659 | A | * | 8/1981 | Koike ............................. 425/547 |
| 4,867,668 | A | * | 9/1989 | Miyairi ...................... 425/192 R |
| 4,938,679 | A | * | 7/1990 | Pietrorazio .................... 425/437 |
| 5,158,736 | A | * | 10/1992 | Giza ............................. 264/334 |
| 5,427,514 | A | * | 6/1995 | Horibe et al. ...................... 425/3 |
| 2003/0030186 | A1 | * | 2/2003 | Riiska et al. ............... 264/328.4 |
| 2003/0039717 | A1 | * | 2/2003 | Hwang et al. ................ 425/556 |
| 2004/0161489 | A1 | * | 8/2004 | Hwang et al. ................ 425/556 |
| 2008/0089975 | A1 | * | 4/2008 | Fairy ............................ 425/568 |
| 2010/0258975 | A1 | * | 10/2010 | Goda et al. ............... 264/272.21 |

* cited by examiner

*Primary Examiner* — Yogendra Gupta
*Assistant Examiner* — Emmanuel S Luk
(74) *Attorney, Agent, or Firm* — Rosenberg, Klein & Lee

(57) ABSTRACT

An injection mold device includes: a stationary mold plate including a stationary mold body, a protrusion, and a sprue having a sprue open end; a movable mold plate formed with a first forming part; and a stripper plate including a stripper mold body, a recess, a second forming part, and a plurality of runners. When the stationary mold plate, the movable mold plate, and the stripper plate are assembled, the protrusion is received within the recess such that the sprue open end is in fluid communication with the runners, and the first forming part and the second forming part form a mold cavity.

2 Claims, 4 Drawing Sheets

INJECTION MOLD DEVICE

CROSS-REFERENCE TO RELATED APPLICATION

This application claims priority of Chinese application no. 200910036778.7, filed on Jan. 15, 2009.

BACKGROUND OF THE INVENTION

1. Field of the Invention

This invention relates to an injection mold device, more particularly to an injection mold device including a stationary mold plate, a movable mold plate, and a stripper plate disposed between the stationary and movable mold plates.

2. Description of the Related Art

Referring to FIG. 1, a conventional three-plate injection mold device 1 includes a stationary mold plate 11, a movable mold plate 12, and a stripper plate 13 disposed between the stationary mold plate 11 and the movable mold plate 12. The stationary mold plate 11 has a bottom surface 114 and includes a sprue 111 and a sprue open end 112 formed in the bottom surface 114. The stripper plate 13 has opposite top and bottom ends 1311, 1312, a plurality of first runners 131 formed in the top end 1311, and a first forming part 132 formed in the bottom end 1312. The stripper plate 13 further has a plurality of second runners 133 that extend downwardly from the first runners 131 and that are in fluid communication with the first runners 131 and the first forming part 132. The movable mold plate 12 has an upper surface 122 and a second forming part 121 formed in the upper surface 122.

When the stationary mold plate 11, the stripper plate 13, and the movable mold plate 12 are assembled (not shown), the first and second forming parts 132, 121 form a mold cavity. Melted plastic material is injected into the sprue 111, and flows through the first and second runners 131, 133, into the mold cavity. When the melted plastic material is cooled, the plastic material in the mold cavity is formed into a molded part, but those remaining in the sprue 111, and the first and second runners 131, 133 become plastic scrap or waste material.

Since each of the second runners 133 in the conventional three-plate injection mold device 1 substantially extends from the top end 1311 to the bottom end 1312 of the stripper plate 13, the length of each of the second runners 133 is substantially identical to a thickness of the stripper plate 13. Therefore, the length of the plastic scrap or waste produced in each second runner 133 is substantially as large as the thickness of the stripper plate 13 so that the amount of the plastic scrap or waste produced in the stripper plate 13 cannot be reduced, thereby increasing the manufacturing cost of products.

SUMMARY OF THE INVENTION

Therefore, an object of the present invention is to provide an injection mold device that can overcome the aforesaid drawback associated with the prior art.

According to the present invention, an injection mold device comprises: a stationary mold plate including a stationary mold body having a bottom surface, a protrusion that protrudes from the bottom surface of the stationary mold body, and a sprue formed in the stationary mold body and having a sprue open end formed in the protrusion; a movable mold plate formed with a first forming part; and a stripper plate disposed between the stationary mold plate and the movable mold plate, and including a stripper mold body having opposite first and second sides, a recess formed in the first side, a second forming part formed in the second side, and a plurality of first runners extending from the recess to the second forming part. When the stationary mold plate, the movable mold plate, and the stripper plate are assembled, the protrusion is received within the recess such that the sprue open end is in fluid communication with the first runners, and the first forming part and the second forming part form a mold cavity.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 2:
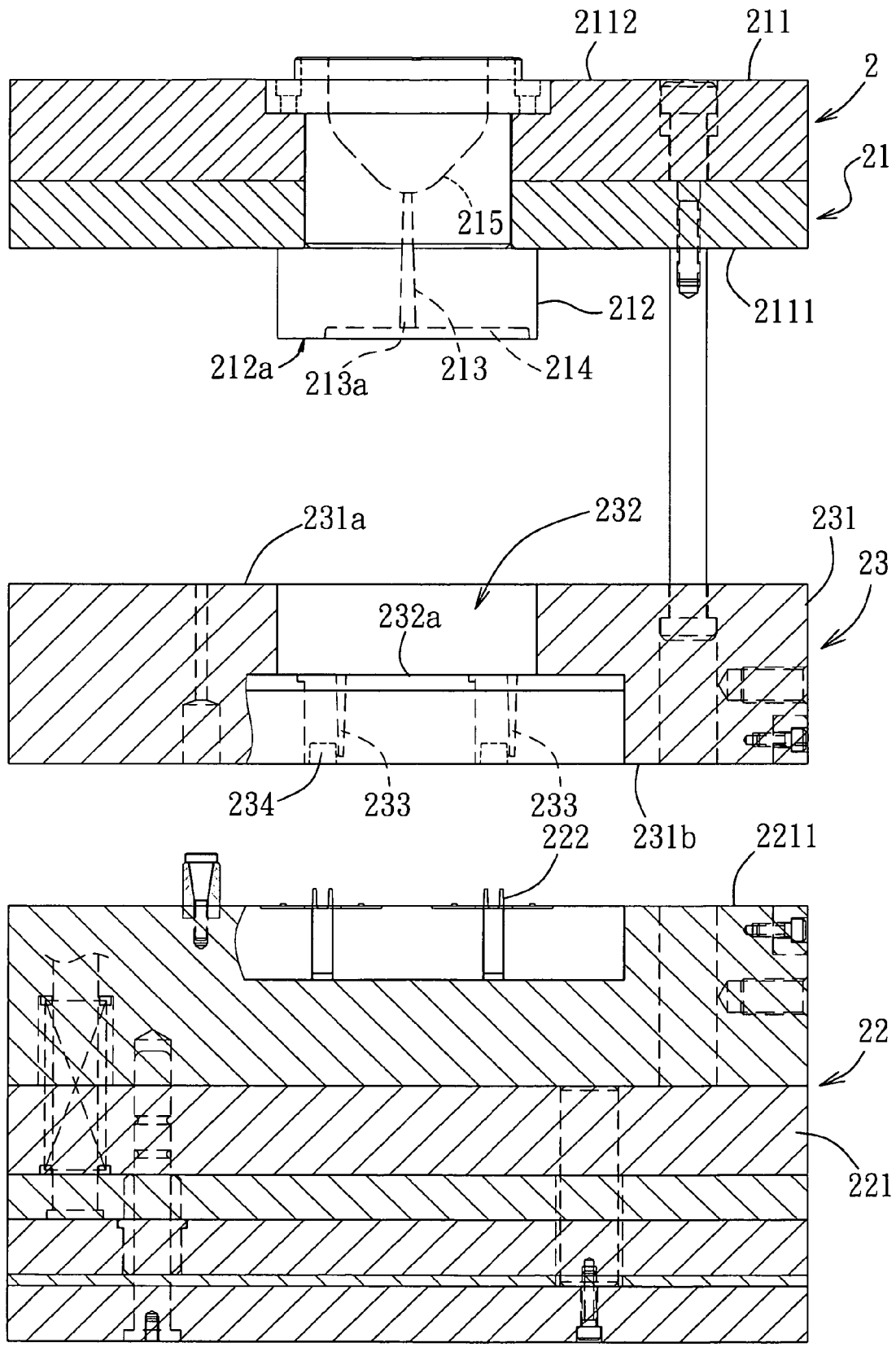
FIG. 2 is an exploded sectional view of the preferred embodiment of an injection mold device according to this invention.
Figure 3:
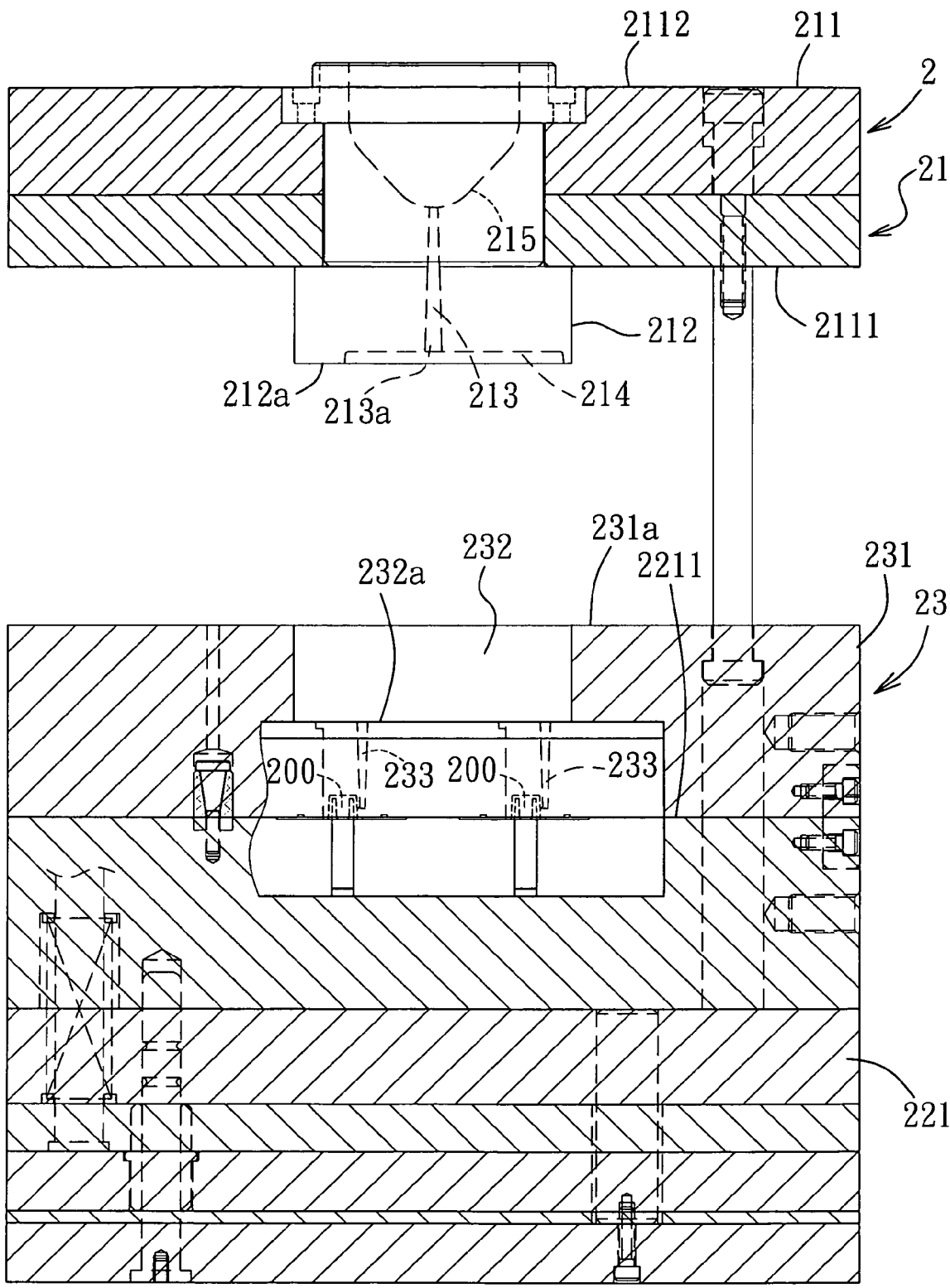
FIG. 3 is the same view as FIG. 2 but with a stripper plate assembled with a movable mold plate.
Figure 4:
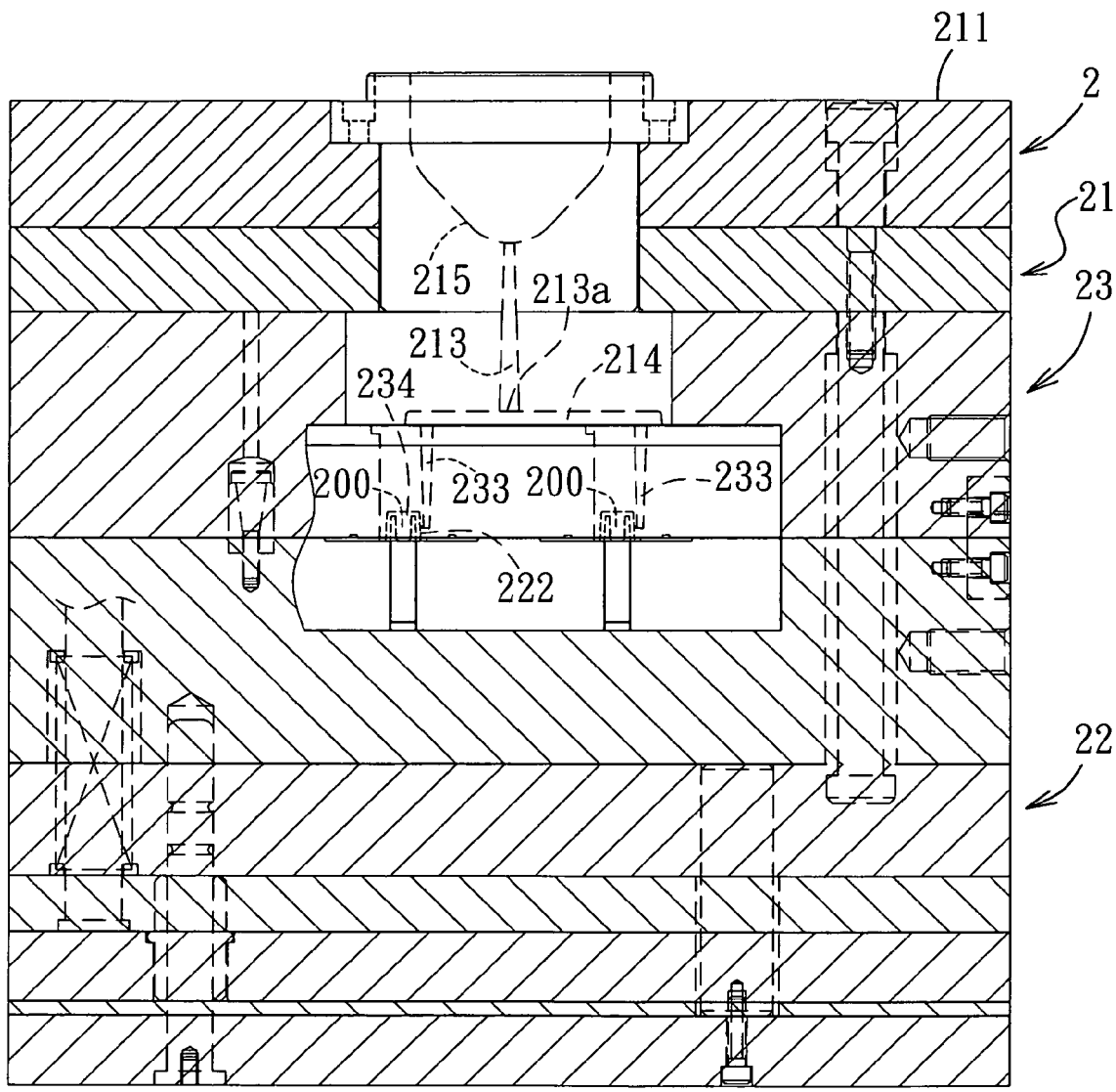
FIG. 4 is the same view as FIG. 2 but with the stripper plate assembled with movable and stationary mold plates.

Referring to FIGS. 2 to 4, there is shown an injection mold device 2 according to a preferred embodiment of this invention. The injection mold device 2 includes a stationary mold plate 21, a movable mold plate 22, and a stripper plate 23. In this embodiment, the movable mold plate 22 is disposed below the stationary mold plate 21.

The stationary mold plate 21 includes a stationary mold body 211, a protrusion 212, and a sprue 213. The stationary mold body 211 has a bottom surface 2111. The protrusion 212 protrudes from the bottom surface 2111 of the stationary mold body 211 and has a bottom end 212a disposed away from the bottom surface 2111. The sprue 213 is formed in the stationary mold body 211, and has a sprue open end 213a extending to the bottom end 212a of the protrusion 212.

The movable mold plate 22 includes a movable mold body 221 and is formed with a first forming part 222. The movable mold body 221 has a top surface 2211 facing the bottom surface 2111 of the stationary mold body 211, and the first forming part 222 is formed in the top surface 2211.

The stripper plate 23 includes a stripper mold body 231, a recess 232 formed in the stripper mold body 231, a plurality of first runners 233, and a second forming part 234. The stripper mold body 231 has a first side 231a facing the bottom surface 2111 of the stationary mold body 211 and a second side 231b facing the top surface 2211 of the movable mold body 221. In this embodiment, the recess 232 is formed in and indented from the first side 231a, and the second forming part 234 is formed in the second side 231b. The first runners 233 extend from the recess 232 to the second forming part 234. The recess 232 has a recess bottom 232a that is below the first side 231a of the stripper mold body 231. The first runners 233 extend from the recess bottom 232a to the second forming parts 234.

In this embodiment, the bottom end 212a of the protrusion 212 is recessed to form a plurality of second runners 214. The sprue open end 213a is in fluid communication with the second runners 214. The second runners 214 are in fluid communication with the first runners 233 when the stationary mold plate 21 and the stripper plate 23 are assembled.

Referring to FIG. 4, when the stationary mold plate 21, the movable mold plate 22, and the stripper plate 23 are assembled, the stripper plate 23 is clamped between the stationary mold plate 21 and the moveable mold plate 22, and the protrusion 212 of the stationary mold plate 21 is received within the recess 232 of the stripper plate 23 such that the sprue open end 213a of the sprue 213 is in fluid communication with the first runners 233 through the second runners 214, and the first forming part 222 and the second forming part 234 form a plurality of mold cavities 200.

During injection molding, melted plastic material is fed into the sprue 213, and travels downwardly into the mold cavities 200 via the sprue open end 213a, the second runners 214 and the first runners 233. After the melted plastic material is cooled, the plastic material in the mold cavities 200 is formed into molded products, and those remaining in the sprue 213 and the first and second runners 233, 214 become waste scraps that must be removed.

Figure 1:
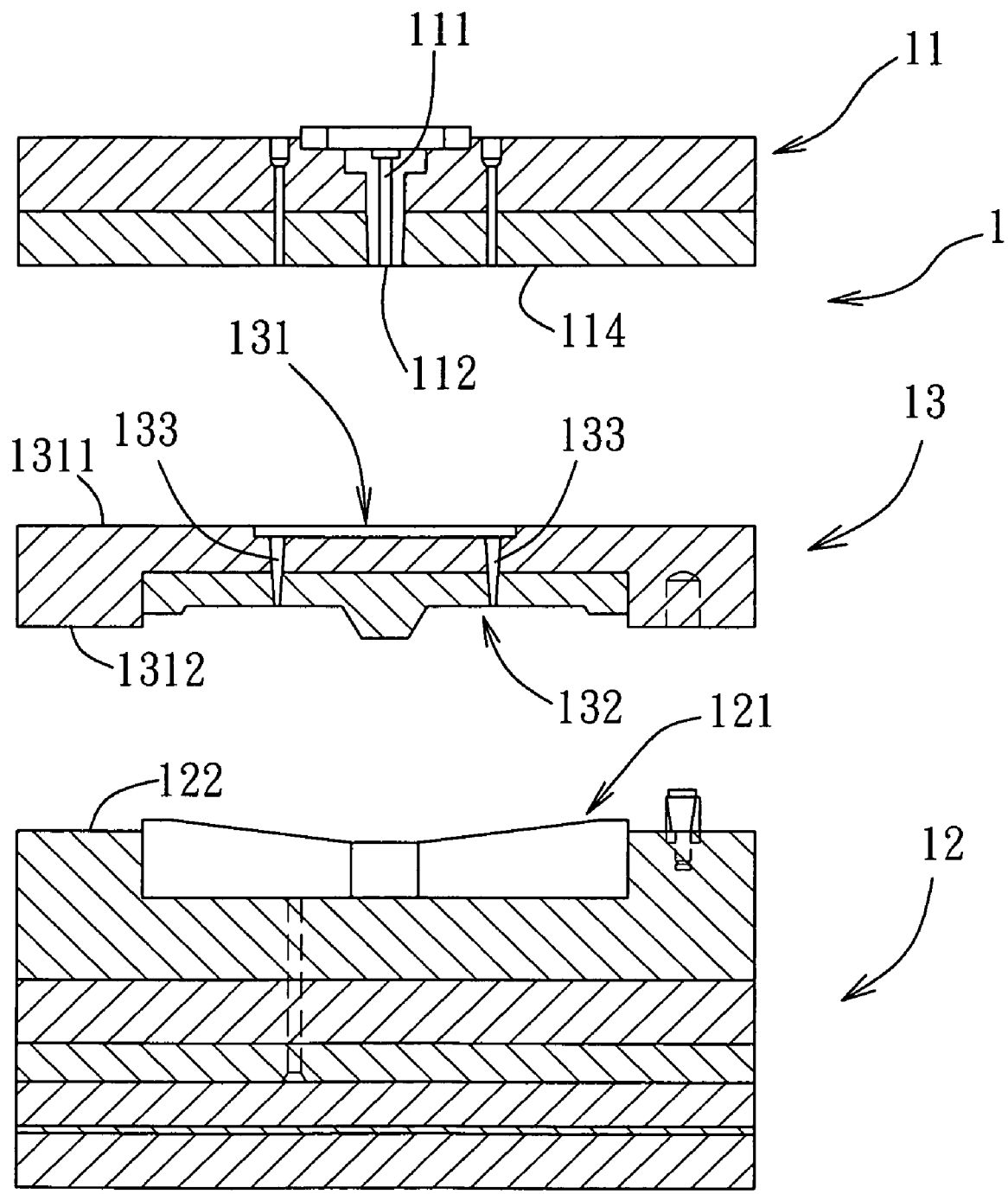
FIG. 1 is an exploded sectional view of a conventional injection mold device.

In this embodiment, since the protrusion 212 is received in the recess 232, a substantial length of the sprue 213 extends into the stripper plate 23 so that the first runners 233 in the stripper plate 23 can be shortened as compared to those of the conventional injection mold device 1 (see FIG. 1). As a result, the amount of the scraps produced in the first runners 233 of the stripper plate 23 is reduced.

It is worth mentioning that the stationary mold body 21 further includes an injection nozzle-receiving hole 215 formed in a top surface 2112 opposite to the bottom surface 2111 of the stationary mold body 211 and in fluid communication with the sprue 213. The nozzle-receiving hole 215 is adapted for receiving a nozzle (not shown) of an injection molding machine therein. Since the nozzle extends into the nozzle-receiving hole 215, the length of the sprue 213, although extending into the protrusion 212, is not increased compared to the sprue 111 of the conventional injection mold device 1. Thus, extension of the sprue 213 into the protrusion 212 does not increase the amount of plastic scrap produced in the sprue 213.

During the opening of the injection mold device 2, the movable mold plate 22 together with the stripper plate 23 is moved downwardly from the stationary mold plate 21, and the stripper plate 23 is subsequently moved upwardly from the movable mold plate 22. At this stage, the molded parts can be removed from the mold cavities 200, and the plastic scrap can be removed from the sprue 213 and the first and second runners 233, 214.

In the injection mold device 2 according to the invention, the protrusion 212 protrudes from the bottom surface 2111 of the stationary mold plate 21, the nozzle-receiving hole 215 is formed in the stationary mold plate 21 for extension of the nozzle thereinto, and the sprue 213 extends through the protrusion 212. When the stationary mold plate 21 and the stripper plate 23 are assembled, the protrusion 212 is received in the recess 232 so that the sprue 213 extends into the stripper plate 23. Therefore, the length of the first runners 233 is reduced, and the amount of the scrap formed in the first runners 233 is decreased compared to that produced in the conventional injection mold device 1. The time required for filling and cooling of the plastic material in the injection mold device 2 can also be reduced.

With the invention thus explained, it is apparent that various modifications and variations can be made without departing from the spirit of the present invention. It is therefore intended that the invention be limited only as recited in the appended claims.

What is claimed is:

1. An injection mold device comprising:

a stationary mold plate including a stationary mold body having a bottom surface, a protrusion that protrudes from said bottom surface of said stationary mold body, and a sprue formed in said stationary mold body and having a sprue open end formed in said protrusion, said protrusion having a bottom end disposed away from said bottom surface of said stationary mold body, said sprue open end extending to said bottom end of said protrusion;

a movable mold plate formed with a first forming part; and a stripper plate disposed between said stationary mold plate and said movable mold plate, and including a stripper mold body having opposite first and second sides, a recess formed in said first side, a second forming part formed in said second side, and a plurality of first runners extending from said recess to said second forming part, said recess having a recess bottom, said first runners extending from said recess bottom to said second forming part, wherein, when said stationary mold plate, said movable mold plate, and said stripper plate are assembled, said protrusion is received within said recess such that said sprue open end is in fluid communication with said first runners, and said first forming part and said second forming part form a mold cavity, said bottom end of said protrusion being recessed to form a plurality of second runners in communication with said sprue open end, said bottom end of said protrusion being in contact with said recess bottom and said second runners being in fluid communication with said first runners when said stationary mold plate and said stripper plate are assembled.

2. The injection mold device of claim 1, wherein said stationary mold body further has a top surface opposite to said bottom surface, and includes an injection nozzle-receiving hole formed in said top surface and in fluid communication with said sprue.

* * * * *